United States Patent
Grimm et al.

(10) Patent No.: US 11,015,625 B2
(45) Date of Patent: May 25, 2021

(54) CONNECTING ELEMENT FOR THE FRICTION-INCREASING CONNECTION OF COMPONENTS, PROCESS FOR MAKING A CONNECTING ELEMENT AND USE OF A CONNECTING ELEMENT

(71) Applicant: 3M INNOVATIVE PROPERTIES COMPANY, St. Paul, MN (US)

(72) Inventors: Florian T. Grimm, Kempten (DE); Martin Engler, Kempten (DE); Andreas I. Rendtel, Kempten (DE); Georg P. Victor, Wiggensbach (DE); Daniel Burtsche, Buchenberg (DE); Martin Schweinberger, Buchenberg (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 16/471,302

(22) PCT Filed: Dec. 19, 2017

(86) PCT No.: PCT/US2017/067281
§ 371 (c)(1),
(2) Date: Jun. 19, 2019

(87) PCT Pub. No.: WO2018/118899
PCT Pub. Date: Jun. 28, 2018

(65) Prior Publication Data
US 2019/0323529 A1    Oct. 24, 2019

(30) Foreign Application Priority Data

Dec. 20, 2016 (EP) ..................... 16205448

(51) Int. Cl.
*F16B 2/00* (2006.01)
(52) U.S. Cl.
CPC .................................. *F16B 2/005* (2013.01)
(58) Field of Classification Search
CPC ... F16B 2/005; Y10T 403/471; Y10T 403/472
See application file for complete search history.

(56) References Cited

U.S. PATENT DOCUMENTS 3,692,341 A * 9/1972 Brown ............... F16B 2/005
403/408.1
6,347,905 B1 2/2002 Lukschandel
(Continued)

FOREIGN PATENT DOCUMENTS

CA     2 273 048     *  5/2003  ............... F16B 1/00
DE   102011005921       6/2012
(Continued)

OTHER PUBLICATIONS

International Search Report for PCT International Application No. PCT/US2017/067281, dated Mar. 27, 2018, 5 pages.

*Primary Examiner* — Michael P Ferguson
(74) *Attorney, Agent, or Firm* — Thomas M. Spielbauer

(57) ABSTRACT

The present disclosure relates to a connecting element and to a process for producing said connecting element. The present disclosure further relates to the use of said connecting element for friction-increasing connection of components to be joined in machine, plant and motor vehicle construction and energy generation.

10 Claims, 9 Drawing Sheets

(56) References Cited

U.S. PATENT DOCUMENTS 9,291,202 B2 3/2016 Von Schleinitz
2003/0087097 A1* 5/2003 Lukschandel ........... F16B 2/005
428/408

FOREIGN PATENT DOCUMENTS

| GB | 2 428 279 | * | 1/2007 | ............. F16B 39/00 |
| WO | WO 2007-063079 | | 6/2007 | |
| WO | WO 2015-082365 | | 6/2015 | |
| WO | WO 2016/131730 | * | 8/2016 | ................ F16B 2/00 |

* cited by examiner

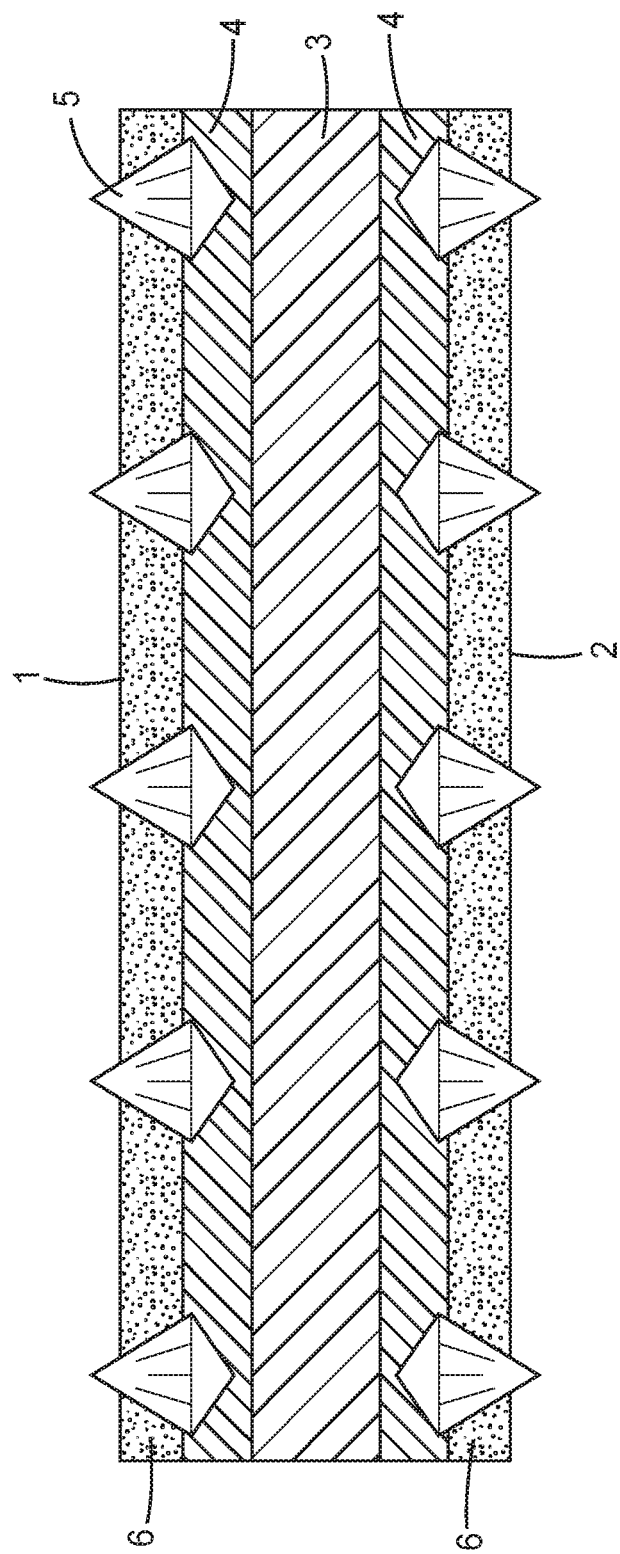

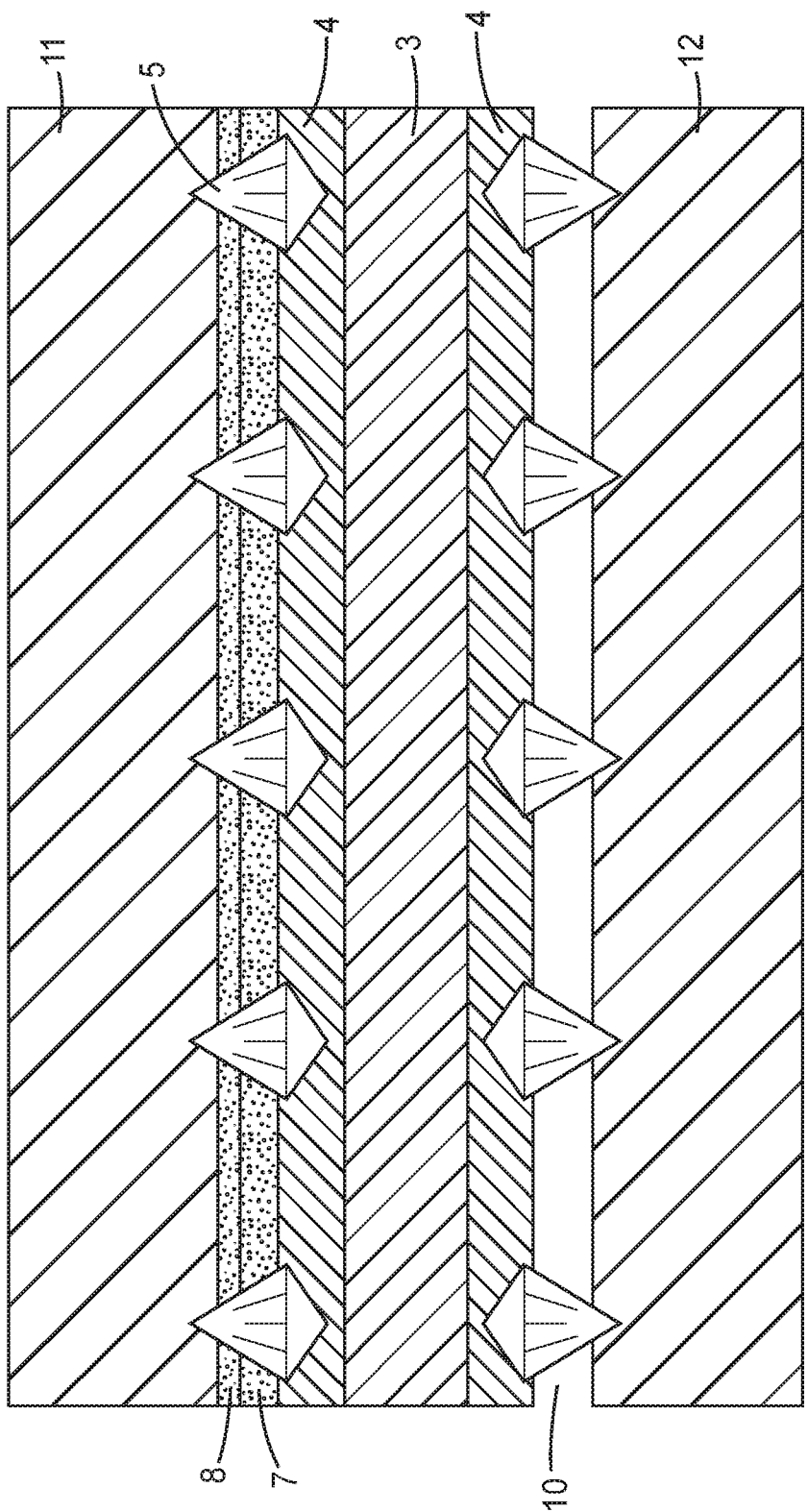

ial stage filing under 35 U.S.C.
CONNECTING ELEMENT FOR THE FRICTION-INCREASING CONNECTION OF COMPONENTS, PROCESS FOR MAKING A CONNECTING ELEMENT AND USE OF A CONNECTING ELEMENT

CROSS REFERENCE TO RELATED APPLICATIONS

This application is a national stage filing under 35 U.S.C. 371 of PCT/US2017/067281, filed Dec. 19, 2017, which claims the benefit of European Application No. 16205448.0, filed Dec. 20, 2016, the disclosure of which is incorporated by reference in their entirety herein.

TECHNICAL FIELD

The present disclosure relates to a connecting element for the friction-increasing connection of components to be joined.

BACKGROUND

Force-locked connections are frequently used in all areas of machine, plant and motor vehicle construction and energy generation for the transmission of forces or torques. The size of the force which can be respectively transmitted depends not only on the structural design but also primarily on the static friction value (coefficient of static friction) of the component surfaces connected to one another. Therefore, in the case of such force-locked connections, it is endeavored to provide friction-increasing measures that allow the greatest possible transverse forces and torques to be transmitted safely. Further, force-locked connections may also be referred to as non-positive connections or frictional connections.

It is known to use friction-increasing interlayers to increase the holding forces or increase the torques than can be transmitted in bolted and clamped connections. U.S. Pat. No. 6,347,905 B1 discloses a connecting element for the friction-increasing play-free reversible connection of components to be joined. The connecting element comprises a spring-elastic steel foil which bears on its surface particles of a defined size, which are fixed on the spring-elastic foil by means of a binder phase. The particles consist of a hard material, preferably of diamond, cubic boron nitride, aluminum oxide, silicon carbide or boron carbide. By using this separate connecting element, the coefficient of static friction can be increased in frictional connections.

For many bolted or clamped connections, the components to be joined need to be prevented from corrosion. This is particularly needed if vehicles or machines are used in corrosive environments, or if the bolted parts consist of different materials, for example carbon steel and aluminum, or if the parts to be joined are coated with paint. These connections need to be prevented from fretting or electrochemical corrosion, and the surface of the parts to be joined should not be damaged to allow a reversible connection of the parts.

There are bolted connections in vehicles for which a high coefficient of friction is required and that are covered by fluids or are flown through by fluids like for example oil. These parts might also be pre-assembled before they are finally bolted together or need to be disassembled and assembled several times. In these applications it is essential that there are no loose hard particles as these particles might create problems in the engine or in other components, and it has to be secured that the fluids do not leak out of the bolted parts.

Therefore there is a need to further improve frictional connections of components with respect to corrosion resistance, particle fixation and sealing properties.

SUMMARY

In a first aspect, the present disclosure relates to a connecting element, comprising a metal substrate having two opposite joining surfaces, wherein the joining surfaces are bearing hard particles, which are fixed on the metal substrate by means of a metallic binder layer, and wherein at least one part of the metallic binder layer of at least one of the two opposite joining surfaces is coated with at least one layer of a coating material, and wherein the coating material is a polymeric material.

In another aspect, the present disclosure also relates to a process for producing such a connecting element, comprising the step of coating of at least one layer of a coating material on at least one part of the metallic binder layer of at least one of the two opposite joining surfaces of the connecting element, wherein the coating material is a polymeric material.

In yet a further aspect, the present disclosure also relates to a device comprising the connecting element as disclosed herein and two components, wherein the two components are frictionally joined with the connecting element.

In yet a further aspect, the present disclosure also relates to the use of such a connecting element for friction-increasing connection of components to be joined in machine, plant and motor vehicle construction and energy generation.

In some embodiments, the connecting element according to the present disclosure is significantly less susceptible to corrosion than the connecting element disclosed in U.S. Pat. No. 6,347,905 B1.

In some embodiments, the connecting element according to the present disclosure is suitable for frictional connections where electrochemical corrosion is a problem as well as fretting.

In some embodiments, the connecting element according to the present disclosure can significantly enhance the sealing effect between two components to be joined; the connections achieved can be even gas-tight.

Loose hard material particles that have been torn out of the metallic binding layer due to rotational forces can be held back in the coating layer of the connecting element according to the present disclosure. Therefore the connecting element disclosed herein can be used in connections that need pre-assembling or that need to be disassembled and assembled several times, and in connections that are covered with or flown through by oil or other fluids.

In some embodiments, the connecting element of the present disclosure prevents unwanted acoustics in vehicles.

By using a connecting element according to the present disclosure, the coefficient of static friction of frictional connections is increased.

BRIEF DESCRIPTION OF THE DRAWINGS

The present disclosure is explained in more detail on the basis of the drawings, in which FIGS. 1A and 1B and FIG. 6 each schematically show a cross-sectional view of a connecting element of the present disclosure, and FIGS. 2-5 and FIGS. 7-8 each schematically show a cross-sectional view of a device according to the present disclosure, comprising a connecting element of the present disclosure and two components, wherein the two components are frictionally joined with the connecting element, i.e. wherein the connecting element is in frictional connection with the two components to be joined.

DETAILED DESCRIPTION

Figure 1B:
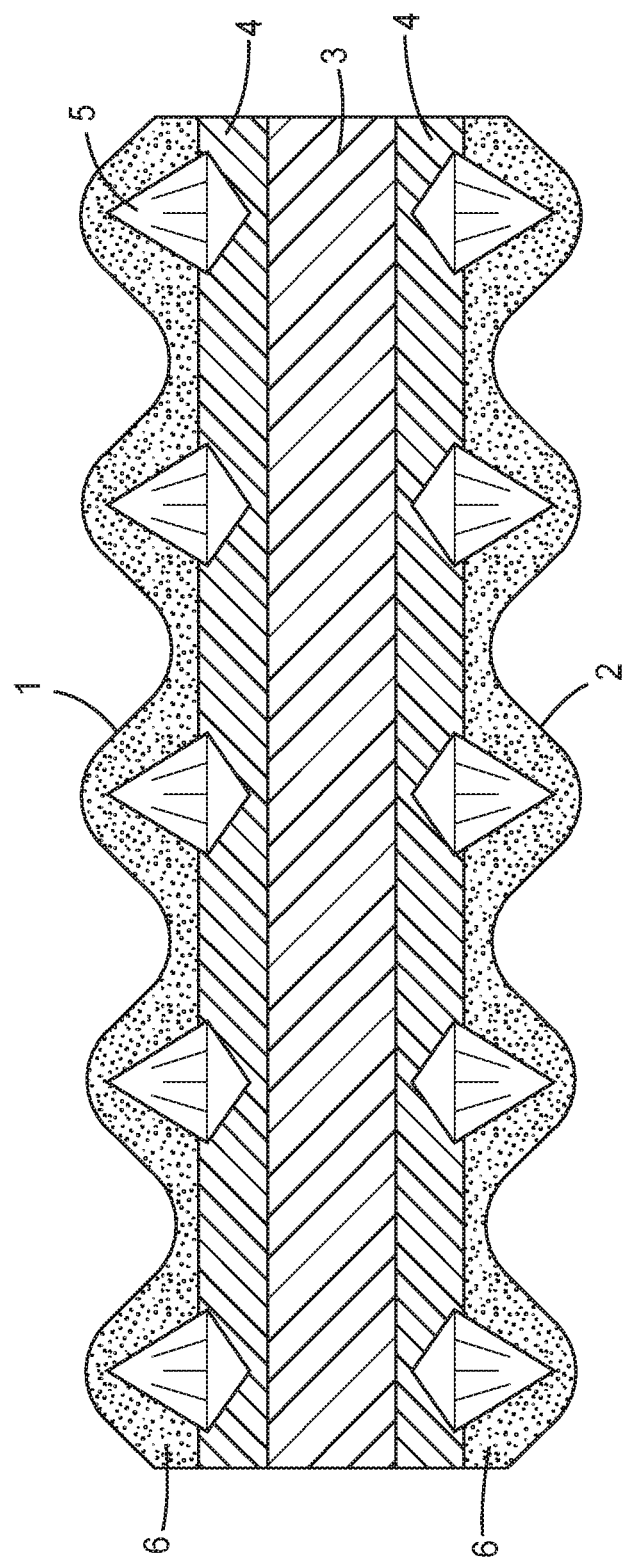

The hard particles preferably consist of a material which, under the particular conditions of use, does not react chemically either with the materials of the components to be joined or with environmental media. It is preferably an inorganic material.

Preferably, the hard particles are selected from the group consisting of carbides, nitrides, borides, silicon dioxide, aluminum oxide, diamond and mixtures thereof. Examples of carbides are silicon carbide, tungsten carbide and boron carbide, examples of nitrides are silicon nitride and cubic boron nitride. Preferably, diamonds are used as hard particles.

The size of the hard particles is selected in such a way that the damage to the joining surfaces caused by the particles being pressed into the surface does not reach an impermissible level. Preferably, this is ensured if the particle diameter is not greater than about three times the peak-to-valley height of the joining surfaces, with peak to valley results from machining of the joining surfaces. A mean particle size of 100 µm ($d_{50}$) or less generally fulfils this requirement. For example, hard particles with a mean particle size ($d_{50}$) of 10 µm, 25 µm, 35 µm, 55 µm, 75 µm or 100 µm can be used. In some embodiments, hard particles with a mean particle size ($d_{50}$) from 10 to 100 µm are used, or from 25 to 75 µm. The mean particle size can be measured by laser diffraction (Cilas, wet measurement).

The hard particles should have a narrow grain size range in which the scatter about a given nominal diameter amounts to no more than about +/−50%. In some embodiments, the scatter about a given nominal diameter should not amount to more than about +/−25%.

The number of hard particles per unit surface area of the joining surfaces of the connecting element may be selected in such a way that the normal force which is available for joining the components together is sufficient to ensure that the particles are pressed into the surface of the components to be joined. This will generally be the case if the area percentage of the joining surfaces of the connecting element which is covered with hard particles is from 3% to 60%. The area percentage of the joining surfaces of the connecting element which is covered with hard particles can be selected dependent on the mean particle size ($d_{50}$) of the hard particles. For example, for a mean particle size ($d_{50}$) of the hard particles of 10 µm from about 8% to 30% of the joining surfaces of the connecting element should be covered with hard particles, for a mean particle size ($d_{50}$) of 35 µm the area percentage should be from about 15 to 45%, and for a mean particle size ($d_{50}$) of 70 µm, the area percentage should be from about 25% to 60%.

The thickness of the metal substrate is selected depending on the application. In some embodiments, the thickness of the metal substrate is up to 2.0 mm. In other embodiments, the thickness is up to 1.0 or up to 0.5 mm. In some other embodiments, the thickness is up to 0.2 mm, in some other embodiments, the thickness is up to 0.1 mm. For large connecting elements that need to have higher strength and stiffness, for example connecting elements used for parts of wind turbines, the thickness of the metal substrate can be up to 0.5 mm or up to 1.0 mm or up to 2.0 mm. For applications that require a thin connecting element, for example if the design of the components to be joined should not be changed, the thickness of the metal substrate can be 0.2 mm or less, or 0.1 mm or less, preferably 0.1 mm.

The metal substrate may be made from steel, for example from unalloyed steel. Also high-alloy steel or stainless steel can be used. Examples for unalloyed steel are grade C75S-1.1248 according to DIN EN 10132-4 or grade C60S-1.1211 according to DIN EN 10132-4.

The metallic binder layer may be a nickel layer.

The thickness of the metallic binder layer may be from 5 to 70 µm, specifically from 10 to 70 µm, more specifically from 10 to 50 µm.

In some embodiments, the thickness of the metallic binder layer is not more than 75% of the mean particle size ($d_{50}$) of the hard particles. In some other embodiments, the thickness of the metallic binder layer is not more than 60% of the mean particle size ($d_{50}$) of the hard particles. In yet some further embodiments, the thickness of the metallic binder layer is not more than 50% of the mean particle size ($d_{50}$) of the hard particles. In yet some other embodiments, the thickness of the metallic binder layer is not more than 20% of the mean particle size ($d_{50}$) of the hard particles. The thickness of the metallic binder layer may be at least 5 µm. The thickness of the metallic binder layer may be selected dependent on the mean particle size of the hard particles. For a larger particle size of the hard particles, a higher thickness of the metallic binder layer may be suitable. The hard particles are protruding from the metallic binder layer. When the connecting element is in frictional engagement with the components to be joined, the hard particles are pressed into the surfaces of the components to be joined, therefore increasing the coefficient of friction of the connection.

The coating material is a polymeric material. In some embodiments, the coating material is a deformable material. The coating material can be elastically deformable or plastically deformable or both.

At least one part of the metallic binder layer of at least one of the two opposite joining surfaces is coated with at least one layer of the coating material. In some embodiments, at least one part of the metallic binder layer and also of the hard particles of at least one of the two opposite joining surfaces is coated with at least one layer of the coating material. In the region on top of the hard particles, the layer of the coating material can be thinner than in the region on top of the metallic binding layer. When the connecting element is in frictional contact with the component to be joined, the layer of the coating material can be pushed apart from the top of the hard particles, due to the deformable properties of the coating material. On the top of the hard particles, the coating material layer is torn open and the hard particles can be pressed into the component to be joined. The layer of the coating material can seal roughnesses and irregularities of the surfaces of the components to be joined and therefore can increase the sealing effect between two components to be joined. In some embodiments, the connection achieved by the connecting element is gas-tight.

In some embodiments, at least one part of the metallic binder layer, or of the metallic binder layer and of the hard particles, of only one of the two opposite joining surfaces is coated with at least one layer of a coating material. In some other embodiments, at least one part of the metallic binder layer, or of the metallic binder layer and of the hard particles, of both of the two opposite joining surfaces is coated with at least one layer of a coating material.

At least one part of the metallic binder layer, or of the metallic binder layer and the hard particles, of one or both of the two opposite joining surfaces is coated with at least one layer of a coating material. For example, if a plate or foil with a central hole is used as connecting element, a ring-shaped region at the outer diameter and a ring-shaped region at the inner diameter of the connecting element may be coated with at least one layer of the coating material. If further holes are present in the connecting element, a ring-shaped region around these holes may also be coated with at least one layer of the coating material.

In some embodiments, the metallic binder layer, or the metallic binder layer and the hard particles, of one or both of the two opposite joining surfaces are coated completely with at least one layer of a coating material.

In some embodiments, the coating material is an adhesive material. The adhesive property of the coating material is useful for pre-assembling the connecting element by gluing it to one of the components to be joined. By gluing, the connecting element will have its correct position on one of the components to be joined and will keep this position during assembling of the second component to be joined. If the coating material is an adhesive material, at least one part of the metallic binder layer and also of the hard particles need to be coated, as the adhesive material on top of the hard particles protruding from the metallic binder layer will adhere on the component to be joined. In some embodiments, at least one part of the metallic binder layer and of the hard particles of one of the two opposite joining surfaces of the connecting element are coated with a coating material being an adhesive material. In some embodiments, at least one part of the metallic binder layer and of the hard particles of both of the two opposite joining surfaces of the connecting element are coated with a coating material being an adhesive material.

In some embodiments, with the coating material being an adhesive material, the sealing effect between two components to be joined is not enhanced and the connection achieved by the connecting element is not gas-tight. In some other embodiments, with the coating material being an adhesive material, the sealing effect between two components to be joined is increased and the connection achieved by the connecting element can be gas-tight.

As already mentioned above, the coating material is a polymeric material. The coating material can be a thermoplastic polymer, a duroplastic polymer or an elastomeric polymer. For example, the coating material can be selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof. In some embodiments, the coating material, such as the epoxy or acrylic or other materials, can have sealing properties or adhesive properties or both sealing and adhesive properties. An example for acrylic materials are polyacrylates, an example for polyurethane materials are thermoplastic polyurethane (TPU) materials, examples for rubber materials are styrene butadiene rubber, chloroprene rubber and isoprene rubber.

In some embodiments, in a first step a first layer of a coating material having sealing properties and not having adhesive properties, is coated on at least one part of the metallic binder layer or of the metallic binder layer and the hard particles, and in a second step, a second layer of a coating material being an adhesive material is coated on the first coating and is also covering the hard particles. This two-layer coating comprising two different coating materials can be useful if the adhesive material does not have sealing properties, or if the adhesive material is a very expensive material whose use has to be minimized.

The thickness of the at least one layer of the coating material may be from 1 to 70 µm, or from 5 to 70 µm, or from 5 to 65 µm. In some embodiments, the thickness of the at least one layer of the coating material may be from 15 to 50 µm.

For achieving a sealing effect between two components to be joined, or even a gas-tight connection, the thickness of the layer of the coating material may be from 5 to 70 µm.

If the coating material is an adhesive material and the coating material does not need to increase the sealing effect between two components to be joined and the connection achieved by the connecting element does not need to be gas-tight, then the thickness of the layer of the coating material can be lower than 5 µm. In this case, the thickness of the layer of the coating material needs to be thick enough to adhere at the component to be joined. This will generally be the case if the thickness of the coating layer is at least 1 µm.

In some embodiments, the thickness of the at least one layer of the coating material may be less than the height of the hard particles protruding from the metallic binder layer.

The height of the hard particles protruding from the metallic binder layer can be calculated by subtracting the height of the metallic binder layer from the mean particle size ($d_{50}$) of the hard particles.

The present disclosure also relates to a device comprising the connecting element as disclosed herein and two components, wherein the two components are frictionally joined with the connecting element.

In some embodiments of the device, the thickness of the at least one layer of the coating material may be less than the height of the hard particles protruding from the metallic binder layer.

The height of the hard particles protruding from the metallic binder layer can be calculated by subtracting the height of the metallic binder layer from the mean particle size ($d_{50}$) of the hard particles.

In some embodiments of the device, the thickness of the at least one layer of the coating material of the connecting element is selected in such a way that the thickness of the at least one layer of the coating material corresponds to the height of the hard particles protruding from the metallic binder layer from which the penetration depth of the hard particles into the component to be joined is subtracted, and the deviation from this thickness may be up to +/−20%. In some embodiments, the deviation from this thickness may be up to +/−10%, or up to +/−5%, or up to +/−1%.

The height of the hard particles protruding from the metallic binder layer can be calculated by subtracting the height of the metallic binder layer from the mean particle size ($d_{50}$) of the hard particles.

When a connecting element as disclosed herein, but without a coating layer on the metallic binder layer of any of the two opposite joining surfaces, is in frictional contact with two components to be joined, the hard particles are pressed into the surface of the components, leaving an air gap between the metallic binder layer and the surface of the component. The width of this gap corresponds to the height of the hard particles protruding from the metallic binder layer from which the penetration depth of the hard particles into the component to be connected is subtracted. By coating the metallic binder layer with a layer of the coating material, this gap can be sealed, while the values for the coefficient of static friction will be increased. The thickness of the at least one layer of the coating material should ideally correspond to the width of the gap between the metallic binder layer and the components to be joined. The deviation of the thickness from the gap width may be up to +/−20%. In some embodiments, the deviation may be up to +/−10%, or up to +/−5%, or up to +/−1%.

In some embodiments of the device, the thickness of the at least one layer of the coating material may be selected by calculation according to the following formula:

$$TC = D*(1-0.62*SQR(P/(HV*AP)))-TB \quad (1)$$

wherein

TC [µm] is the thickness of the at least one layer of the coating material,

D [µm] is the mean particle size (d50) of the hard particles,

"SQR" means square root,

P [MPa] is the contact pressure of the two components frictionally joined with the connecting element, HV [kg/mm$^2$] is the Vickers hardness of the components to be joined, AP [%] is the area percentage of joining surface of the connecting element covered with hard particles, and TB [µm] is the thickness of the metallic binder layer.

The deviation of the thickness of the at least one layer of the coating material from the value TC as calculated by the above formula (I) may be up to +/−20%. In some embodiments, the deviation may be up to +/−10%, or up to +/−5%, or up to +/−1%.

Various embodiments of the connecting element according to the present disclosure are shown in the drawings.

FIG. 1A schematically shows the cross-sectional view of a first embodiment of a connecting element of the present disclosure. The metal substrate 3 has two opposite joining surfaces 1, 2 which are bearing hard particles 5. The hard particles 5 are fixed on the metal substrate 3 by means of a metallic binder layer 4. The metallic binder layer 4 of both joining surfaces 1, 2 is coated with a layer of a coating material 6. The coating material is a polymeric material having sealing properties. In this embodiment, the layer of the coating material is not coated on the hard particles 5.

FIG. 1B schematically shows the cross-sectional view of a second embodiment of a connecting element of the present disclosure. The metal substrate 3 has two opposite joining surfaces 1, 2 which are bearing hard particles 5. The hard particles 5 are fixed on the metal substrate 3 by means of a metallic binder layer 4. The metallic binder layer 4 of both joining surfaces 1, 2 is coated with a layer of a coating material 6. The coating material is a polymeric material having sealing properties. In this embodiment, the hard particles 5 and the metallic binder layer 4 are coated with a layer of the coating material 6.

Figure 2:
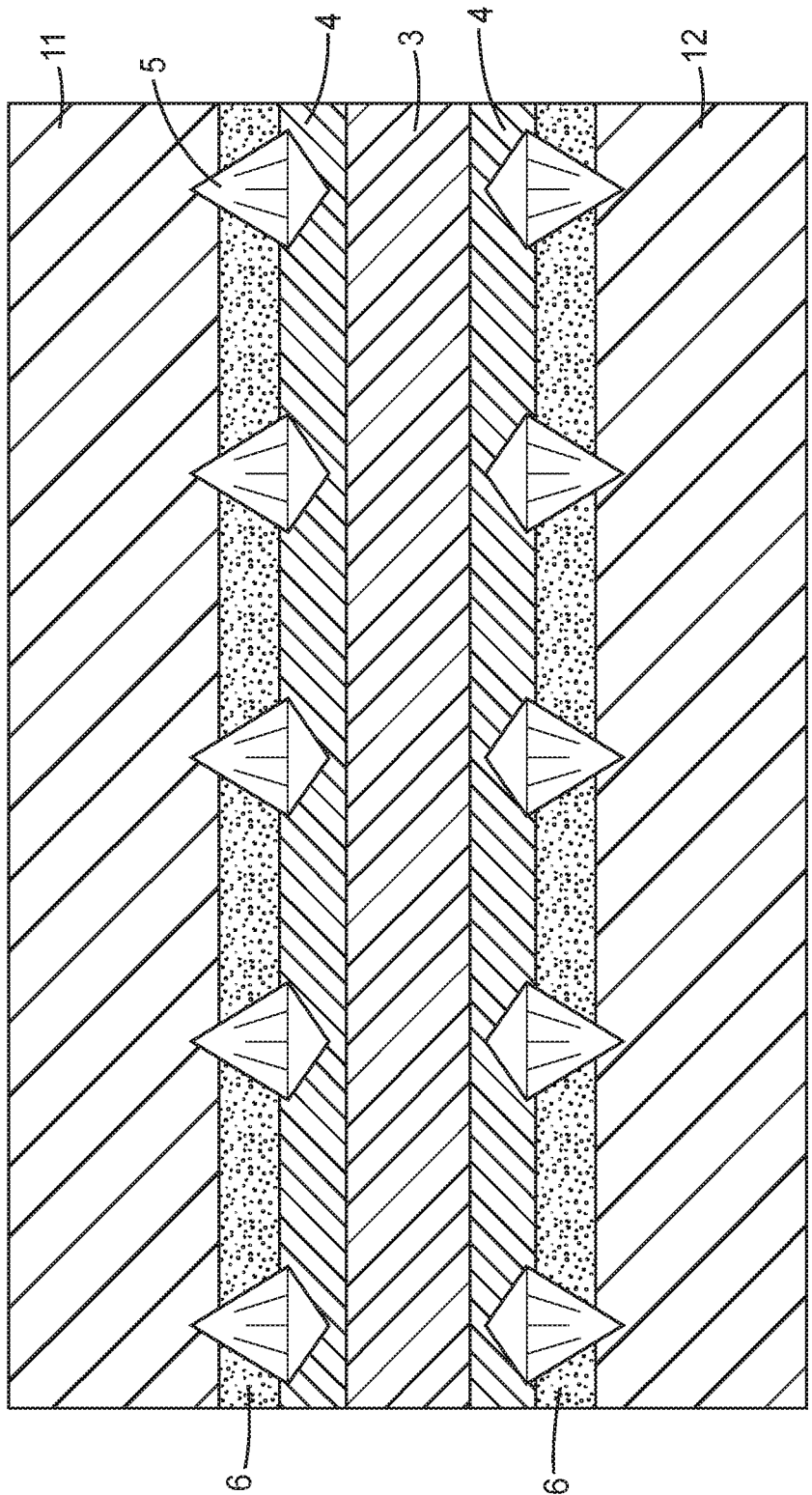

FIG. 2 schematically shows a cross-sectional view of a first embodiment of a device according to the present disclosure, comprising the connecting element of FIG. 1A or 1B and two components 11, 12, the two components 11, 12 being frictionally joined with the connecting element of FIG. 1A or 1B, i.e. the connecting element of FIG. 1A or 1B being in frictional connection with the two components 11, 12 to be joined. In the case of FIG. 1B, the layer of the coating material 6 on top of the hard particles 5 has been pushed apart from the top of the hard particles, i.e. has been peeled off from the hard particles, and has been moved aside, thereby increasing the thickness of the coating layer in the region between the hard particles. In the case of FIG. 1A, the hard particles have not been coated with a layer of the coating material, and therefore the layer of the coating material needs not to be pushed apart. The two embodiments shown in FIG. 1A and FIG. 1B both result in the same situation, shown in FIG. 2, when the connecting element is in frictional connection with two components to be joined. There is no air gap between the layers of the coating material 6 and the components 11, 12 to be joined. The sealing effect between two components to be joined is enhanced and the connection achieved by the connecting element can be gas-tight. Also the coefficient of static friction is enhanced by the hard particles 5 being pressed into the components 11, 12 to be joined.

There are many bolted connections in passenger cars. For example, the subframe and frame or the axles and the dampers of a passenger car are connected with bolts. For weight reduction the subframe is typically made from aluminum and the frame is made from steel and is coated with a layer of paint to prevent corrosion. By using the connecting element of FIG. 2 between these two components the diamonds are pressed into the components, thus leading to a higher coefficient of friction. The diamonds being pressed into the components also penetrate the paint of the frame. If a connecting element without the coating layer 6 on both joining surfaces would be used, the penetration of the paint could lead to corrosion at the frame and possibly also on the subframe. By using the connecting element of FIG. 2 with the coating layer 6 on both joining surfaces, corrosion can be prevented due to the sealing function of the connecting element.

Figure 3:
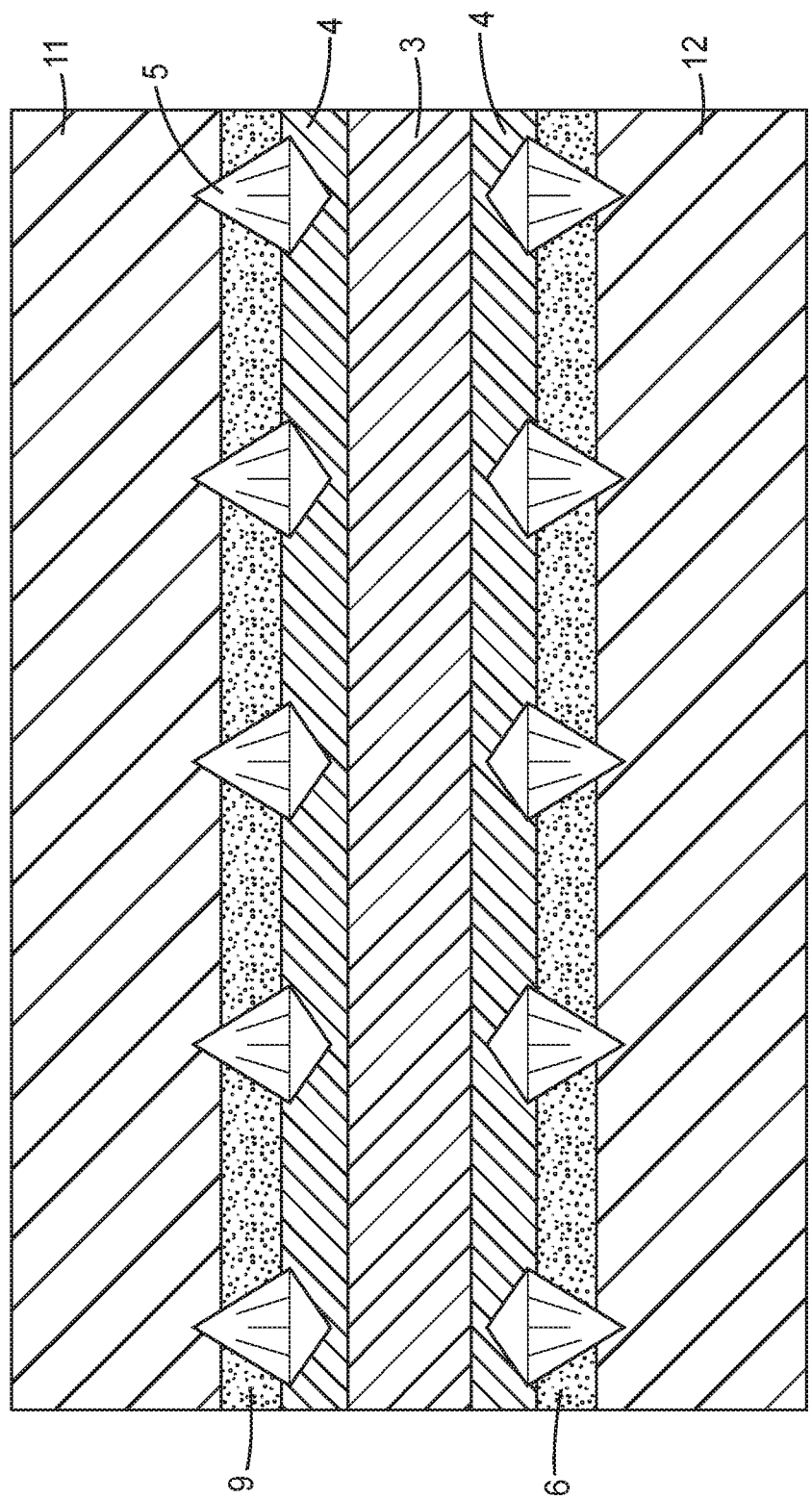
Figure 4:
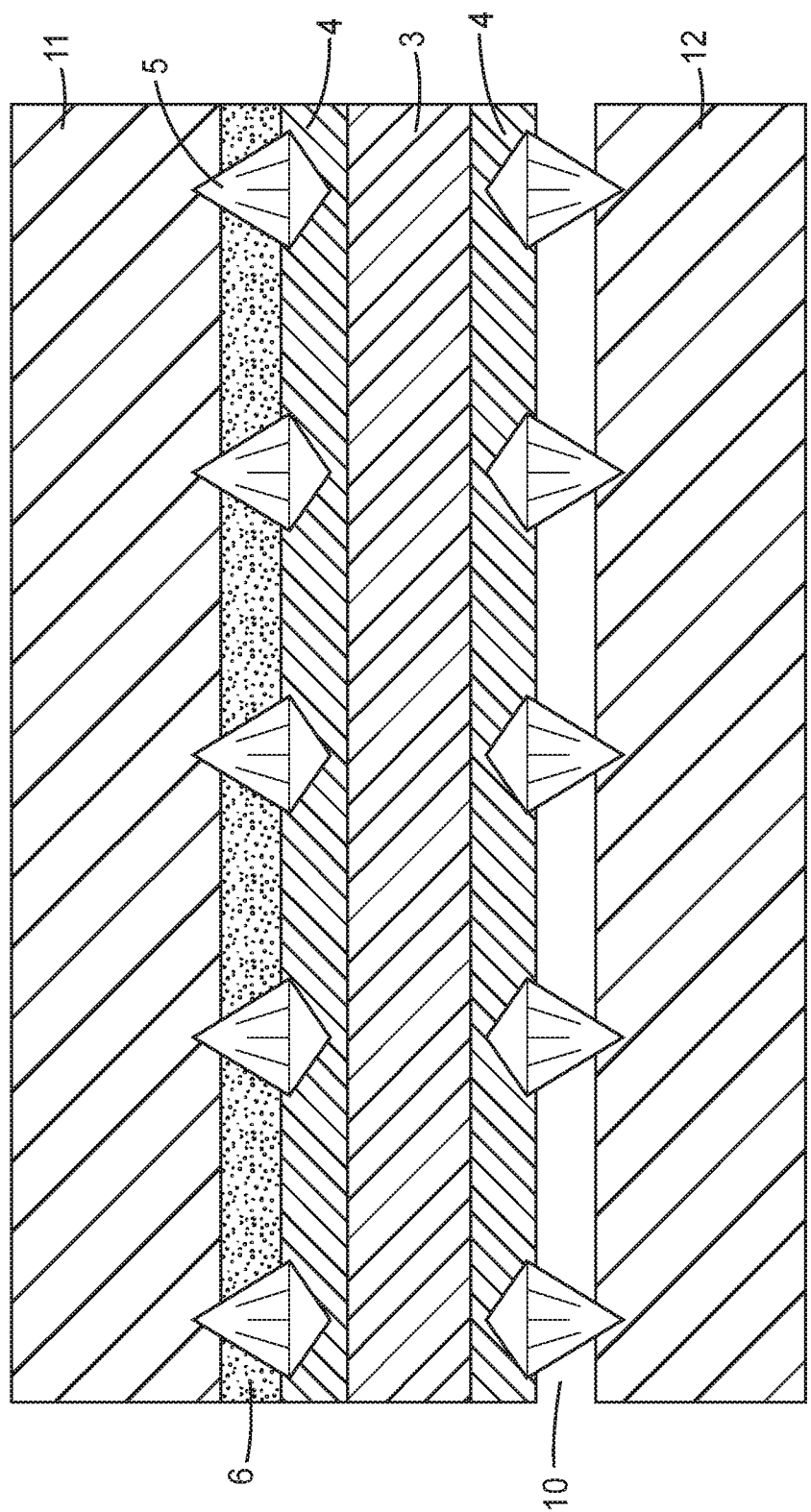
Figure 5:
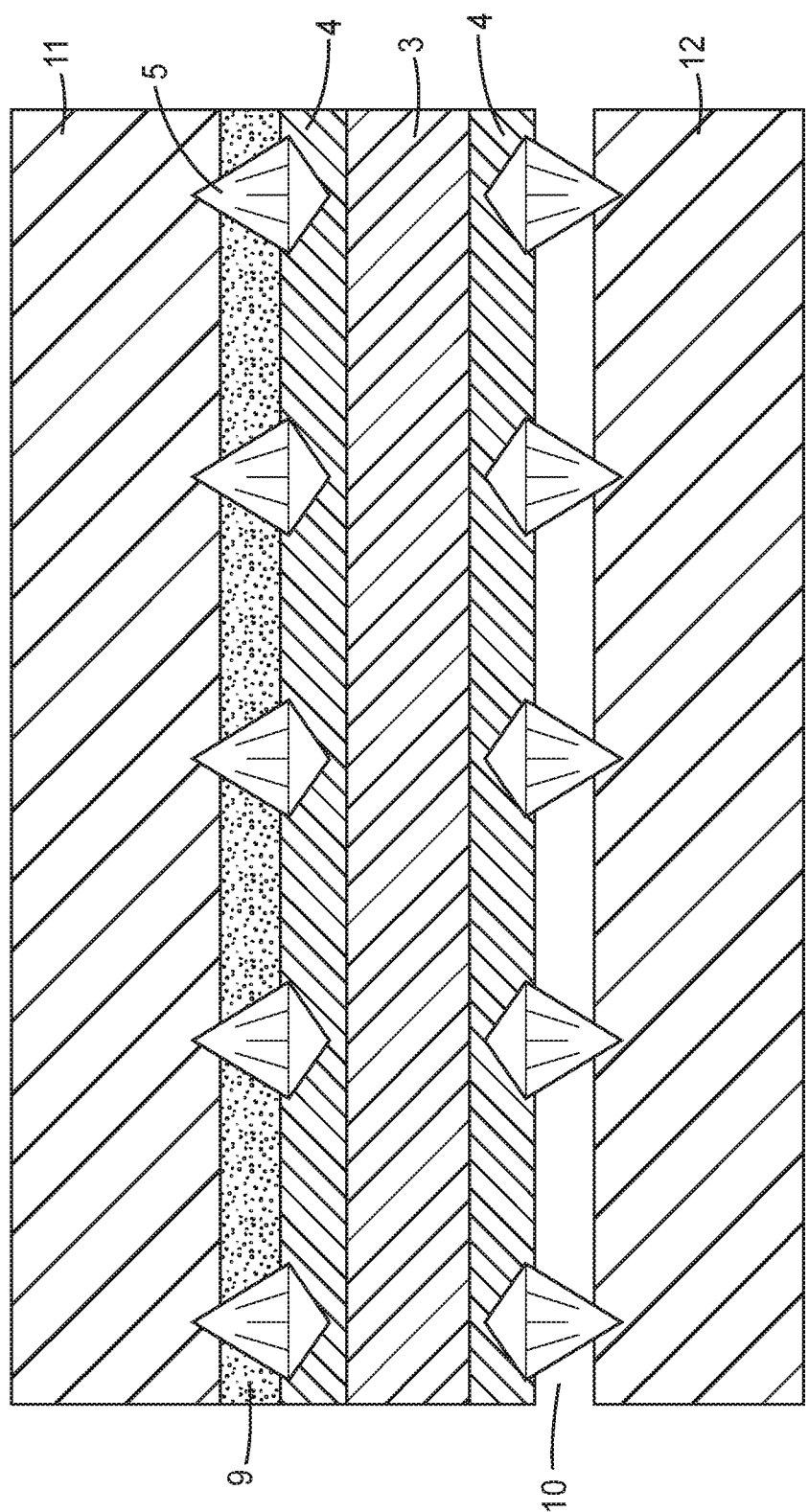

FIGS. 3-5 schematically show cross-sectional views of a second (FIG. 3), a third (FIG. 4) and a fourth (FIG. 5) embodiment of a device of the present disclosure, comprising a third (FIG. 3), fourth (FIG. 4) and fifth (FIG. 5) embodiment of a connecting element of the present disclosure and two components 11, 12, the two components 11, 12 being frictionally joined with the connecting element, i.e. the connecting element being in frictional connection with the two components 11, 12 to be joined.

In FIG. 3, the metallic binder layer 4 of one of the two joining surfaces of the metal substrate 3 is coated with a layer of a coating material 6. The coating material 6 is a polymeric material having sealing properties. On the other joining surface, the metallic binder layer 4 is coated with a layer of a coating material 9. The coating material 9 is a polymeric material being an adhesive material which may also have sealing properties. The adhesive properties are used for pre-assembling the connecting element at the component 11 to be joined. There is no air gap between the layers of the coating material 6, 9 and the components 11, 12 to be joined. The sealing effect between two components to be joined is enhanced and the connection achieved by the connecting element can be gas-tight. Also the coefficient of static friction is enhanced by the hard particles 5 being pressed into the components 11, 12 to be joined.

In FIG. 4, the metallic binder layer of one of the two joining surfaces of the metal substrate 3 is coated with a layer of a coating material 6. The coating material 6 is a polymeric material having sealing properties. On the other joining surface, the metallic binder layer 4 is not coated, leaving an air gap 10 between the metallic binder layer 4 and the component 12. There is no air gap between the layer of the coating material 6 and the component 11 to be joined. The connecting element of FIG. 4 can be used, for example, in applications with the components 11 and 12 being made from two different materials, for example component 11 from aluminum and component 12 from stainless steel. The less noble metal aluminum is prevented from contact corrosion or fretting by coating the metallic binder layer 4 with the layer of the coating material 6. The coefficient of static friction is enhanced by the hard particles 5 being pressed into the components 11, 12 to be joined.

In FIG. 5, the metallic binder layer of one of the two joining surfaces of the metal substrate 3 is coated with a layer of a coating material 9. The coating material 9 is a polymeric material being an adhesive material which may also have sealing properties. The adhesive properties are used for pre-assembling the connecting element at the components 11 to be joined. On the other joining surface, the metallic binder layer 4 is not coated, leaving an air gap 10 between the metallic binder layer 4 and the component 12. There is no air gap between the layer of the coating material 9 and the component 11 to be joined. The coefficient of static friction is enhanced by the hard particles 5 being pressed into the components 11, 12 to be joined.

Figure 6:
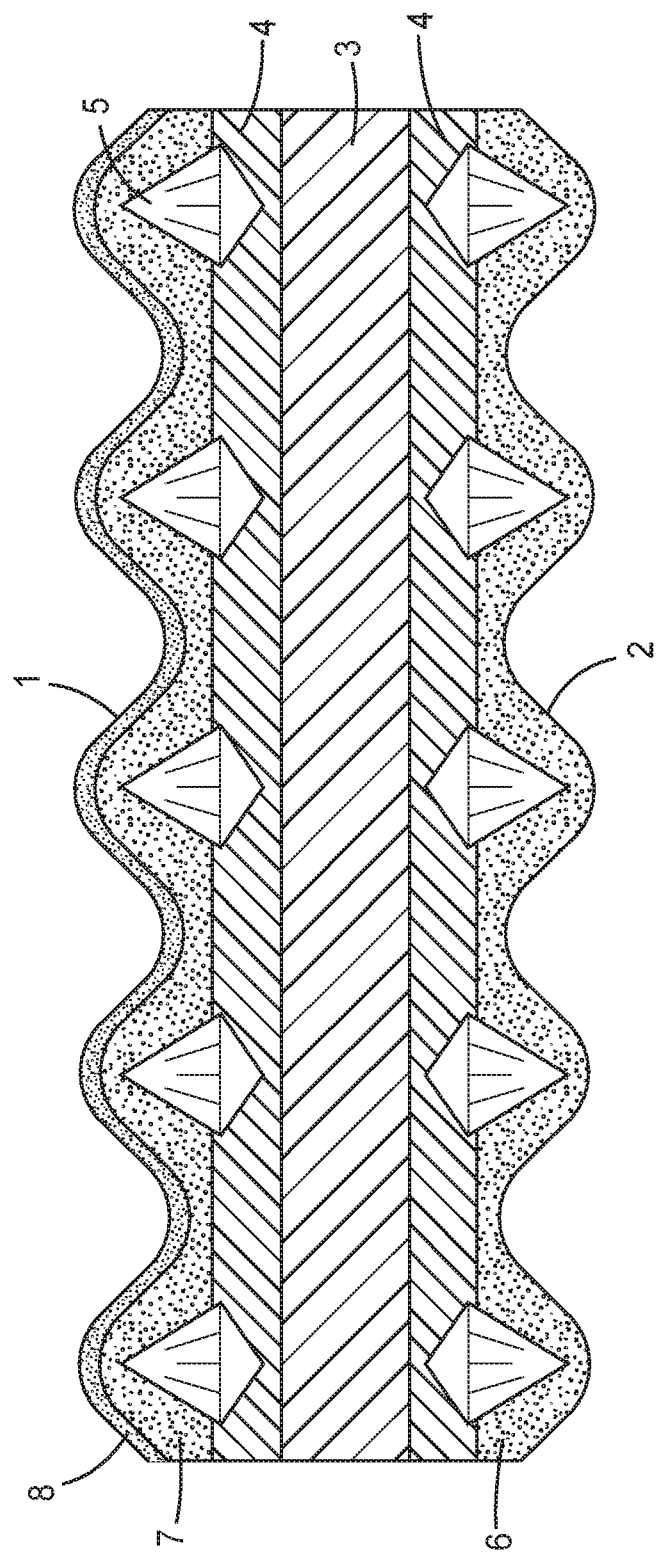

FIG. 6 schematically shows the cross-sectional view of a sixth embodiment of a connecting element of the present disclosure. The metal substrate 3 has two opposite joining surfaces 1, 2 which are bearing hard particles 5. The hard particles 5 are fixed on the metal substrate 3 by means of a metallic binder layer 4. The metallic binder layer 4 of the joining surface 2 is coated with a layer of a coating material 6. The coating material 6 is a polymeric material having sealing properties. The metallic binder layer 4 of the joining surface 1 is coated in a first step with a first layer of a coating material 7. The coating material 7 is a polymeric material having sealing properties. In a second step, the metallic binder layer 4 of the joining surface 1 is coated with a second layer of a coating material 8 which is coated on the first layer of the coating material 7. The coating material 8 is a polymeric material having adhesive properties. The coating material 8 having adhesive properties is also covering the hard particles 5. The adhesive material on top of the coating layer 7 and the hard particles 5 protruding from the metallic binder layer 4 will adhere on the component to be joined.

Figure 7:
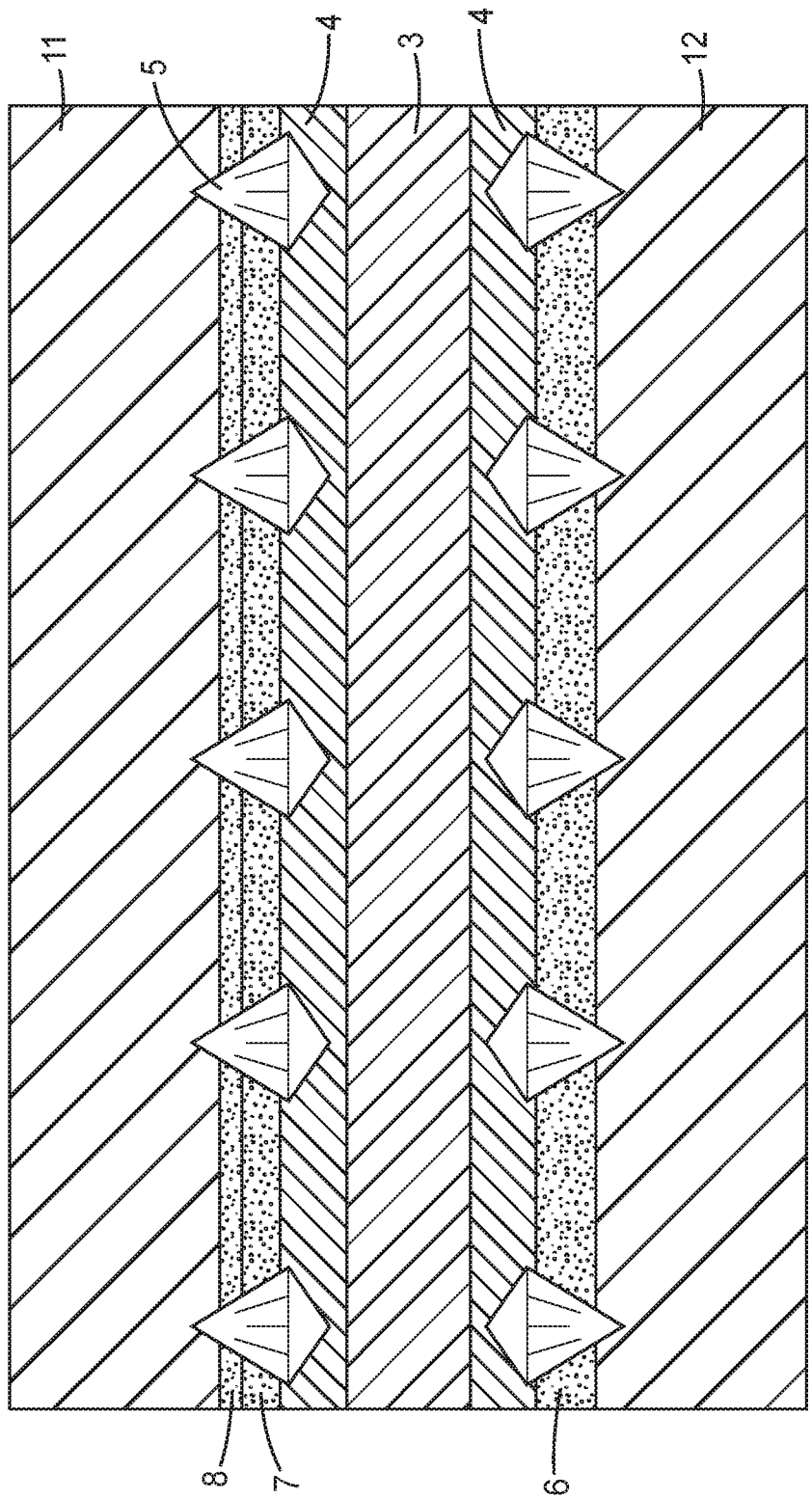

FIG. 7 schematically shows a cross-sectional view of a fifth embodiment of a device of the present disclosure, comprising the connecting element of FIG. 6 and two components 11, 12, the two components 11, 12 being frictionally joined with the connecting element of FIG. 6, i.e. the connecting element of FIG. 6 being in frictional connection with the two components 11, 12 to be joined. The layer of the coating material 6 on top of the hard particles 5 has been pushed apart from the top of the hard particles, i.e. has been peeled off from the hard particles, and has been moved aside, thereby increasing the thickness of the coating layer 6 in the region between the hard particles. The two layers of the coating materials 7 and 8 on top of the hard particles 5 have been pushed apart from the top of the hard particles, i.e. have been peeled off from the hard particles, and have been moved aside, thereby increasing the thickness of the coating layers 7, 8 in the region between the hard particles. The adhesive properties of the coating material 8 are used for pre-assembling the connecting element at the component 11 to be joined. There is no air gap between the layers of the coating materials 6, 8 and the components 11, 12 to be joined. The sealing effect between two components to be joined is enhanced and the connection achieved by the connecting element can be gas-tight. Also the coefficient of static friction is enhanced by the hard particles 5 being pressed into the components 11, 12 to be joined.

FIG. 8 schematically shows a cross-sectional view of a sixth embodiment of a device of the present disclosure, comprising a seventh embodiment of a connecting element of the present disclosure and two components 11, 12, the two components 11, 12 being frictionally joined with the connecting element, i.e. the connecting element being in frictional connection with the two components 11, 12 to be joined. In FIG. 8, the metallic binder layer of one of the two joining surfaces of the metal substrate 3 is coated with a first layer of a coating material 7 and a second layer of a coating material 8. The coating material of the second layer is an adhesive material. The adhesive properties are used for pre-assembling the connecting element at the component 11 to be joined. On the other joining surface, the metallic binder layer 4 is not coated, leaving an air gap 10 between the metallic binder layer 4 and the component 12. There is no air gap between the layer of the coating material 8 and the component 11 to be joined. The connecting element of FIG. 8 can be used, for example, in applications with the components 11 and 12 being made from two different materials, for example component 11 from aluminum and component 12 from stainless steel. The less noble metal aluminum is prevented from contact corrosion or fretting by coating the metallic binder layer 4 with the layer of the coating material 8. Also the coefficient of static friction is enhanced by the hard particles 5 being pressed into the components 11, 12 to be joined.

Some further embodiments of the Disclosure are described below.

In an eighth embodiment, the present disclosure provides a connecting element, wherein the connecting element comprises a steel substrate having two opposite joining surfaces, and wherein the joining surfaces are bearing diamonds, which are fixed on the steel substrate by means of a nickel binder layer, and wherein the nickel binder layer of both opposite joining surfaces is coated with a layer of a coating material, wherein the coating material is a polymeric material and is selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof, and wherein the mean particle size ($d_{50}$) of the diamonds is from 25 μm to 75 μm, and wherein the thickness of the nickel layer is from 10 to 50 μm, and wherein the thickness of the layer of the coating material is from 15 to 50 μm.

In a ninth embodiment, the present disclosure provides a connecting element, wherein the connecting element comprises a steel substrate having two opposite joining surfaces, and wherein the joining surfaces are bearing diamonds, which are fixed on the steel substrate by means of a nickel binder layer, and wherein the nickel binder layer and the diamonds of both opposite joining surfaces are coated with a layer of a coating material, wherein the coating material is a polymeric material and is selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof, and wherein the mean particle size ($d_{50}$) of the diamonds is from 25 μm to 75 μm, and wherein the thickness of the nickel layer is from 10 to 50 μm, and wherein the thickness of the layer of the coating material is from 15 to 50 μm.

In a tenth embodiment, the present disclosure provides a connecting element, wherein the connecting element comprises a steel substrate having two opposite joining surfaces, and wherein the joining surfaces are bearing diamonds, which are fixed on the steel substrate by means of a nickel binder layer, and wherein the nickel binder layer of one of the two opposite joining surfaces are coated with a layer of a coating material, wherein the coating material is a polymeric material and is selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof, and wherein the mean particle size ($d_{50}$) of the diamonds is from 25 μm to 75 μm, and wherein the thickness of the nickel layer is from 10 to 50 μm, and wherein the thickness of the layer of the coating material is from 15 to 50 μm.

In an eleventh embodiment, the present disclosure provides a connecting element, wherein the connecting element comprises a steel substrate having two opposite joining surfaces, and wherein the joining surfaces are bearing diamonds, which are fixed on the steel substrate by means of a nickel binder layer, and wherein the nickel binder layer and the diamonds of one of the two opposite joining surfaces are coated with a layer of a coating material, wherein the coating material is a polymeric material and is selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof, and wherein the mean particle size ($d_{50}$) of the diamonds is from 25 μm to 75 μm, and wherein the thickness of the nickel layer is from 10 to 50 μm, and wherein the thickness of the layer of the coating material is from 15 to 50 μm.

The connecting element as disclosed herein can be produced by a process comprising:

providing a metal substrate having two opposite joining surfaces;

coating the metallic substrate on both joining surfaces by a plating technique with a metallic binder layer and hard particles, thereby fixing the hard particles on the metal substrate by means of the metallic binder layer;

coating of at least one layer of a coating material on at least one part of the metallic binder layer of at least one of the two opposite joining surfaces, wherein the coating material is a polymeric material.

The metallic binder layer may be a nickel layer. The metallic binder layer may be produced by means of an electrodeposition process, for example by an external current-free (=chemical) electroplating process, also called electroless plating process, preferably by an electroless nickel plating process. The hard particles may be applied on the joining surfaces of the metal substrate by means of an electrodeposition process, for example by an electroless nickel plating process, using a chemical nickel bath with dispersed hard particles. Such electrodeposition and electroplating processes are customary in coating technology. The chemical nickel layer can be hardened by means of a heat treatment at up to about 400° C., with the result that the adhesion to the metal substrate is improved and the inherent hardness of the layer is increased. The hard particles are fixed on the metal substrate by means of the metallic binder layer.

For coating of the metallic binder layer or the metallic binder layer and the hard particles with at least one layer of the coating material, various methods can be applied. Suitable coating methods are, for example, cathodic dip coating, spray coating, screen printing, tampon printing and inkjet printing. For these coating methods, flowable coating formulations comprising solvents can be used. After applying the coating formulation on the part to be coated, the parts are dried in order to evaporate the solvent of the coating formulation. It is possible to bake the dried coatings, for example at temperatures of 120 to 180° C. By baking the coatings, a continuous and defect-free layer can be obtained.

By cathodic dip coating, the part to be coated, i. e. the connecting element not yet coated with a layer of the coating material, is dipped as cathode into a bath with a solution of a coating material. A coating is deposited on the connecting element from the solution by direct current. The thickness of the layer of the coating material applied by cathodic dip painting can be, for example, 7 to 15 μm, 15 to 25 μm, 25 to 35 μm and more than 35 μm. After applying the layer of the coating material, the layer of the coating material is baked, for example at temperatures of 120 to 180° C. For example, aqueous solutions of epoxy and acryl can be used for cathodic dip coating.

By spray coating, the layer of the coating material is applied on the part to be coated, i. e. on the connecting element not yet coated with a layer of the coating material, in the form of a lacquer by means of a spray gun. The lacquer comprises particles to be coated and solvents. By suitably selecting spraying parameters such as spraying distance, spraying angle, spraying pressure and diameter of spray nozzles, the thickness of the layer of the coating material can be selected. After applying the lacquer, the solvent needs to be evaporated by drying the coating. It is possible to bake the spray-dried coatings, for example at temperatures of 120 to 180° C.

For screen printing, the layer of the coating material is applied on the part to be coated, i.e. on the connecting element not yet coated with a layer of the coating material, a flowable coating formulation is used which is passed through a sieve by means of a squeegee or doctor blade. The thickness of the layer of the coating material is selected by the sieve width. The smaller the mesh size of the sieve, the thinner will be the resulting layer of the coating material which is passed through the sieve.

By tampon printing, the layer of the coating material is applied on the part to be coated, i.e. on the connecting element not yet coated with a layer of the coating material, by means of a silicone roller, also referred to as "tampon". The tampon is wetted by a flowable coating formulation, and the wetted tampon is rolled over the part to be coated, thereby applying a layer of the coating material on the part to be coated.

By inkjet printing, the layer of the coating material is applied on the part to be coated, i.e. on the connecting element not yet coated with a layer of the coating material, by means of an inkjet printer. The coating material is used as an ink. After applying the coating material, the solvent needs to be evaporated by drying the coating. It is possible to bake the inkjet printed coatings, for example at temperatures of 120 to 180° C.

The connecting element disclosed herein can be used for friction-increasing connection of components to be joined in machine, plant and motor vehicle construction and energy generation. The connecting element disclosed herein can be used for friction-increasing, play-free and/or reversible connection of components to be joined in machine, plant and motor vehicle construction and energy generation.

In principle, the connecting element disclosed herein can be used in any type of frictional connection throughout the field of mechanical engineering, and in particular, if the forces which can be transmitted by the component surfaces which are imposed by the design are insufficient.

For example, the connecting element disclosed herein can be used for frictional connections, such as bolted or clamped connections, between parts or components of vehicles, such as subframe and undercarriage, or crankshaft and sprocket, or in camshaft applications, or axle or damper applications, or between parts or components of wind turbines, such as segmented towers or rotor hub and rotor shaft.

The present disclosure will be described in more detail by the following examples.

EXAMPLES

Example 1

For the production of a connecting element as disclosed herein, a ring-shaped steel foil (grade C75S-1.1248 according to DIN EN 10132-4) with a thickness of 0.1 mm, an outer diameter of 30 mm and an inner diameter of 15 mm is coated o both sides by electroless plating with a nickel layer and diamonds with a mean particle size ($d_{50}$) of 50 µm. As used herein, the ring-shaped steel foils are also referred to as "shims".

For electroless nickel plating, the shims are placed on suitable racks and are pretreated in accordance with the general rules of electroless nickel plating by degreasing, pickling and activating. Then, the carrier bearing the shims is immersed in a chemical nickel bath in which diamond powder with an average particle diameter of 50 µm is dispersed. The quantity of dispersed diamond powder is selected in such a way that under the parameters prevailing in the coating bath (bath movement, deposition rate), the desired proportion of diamond in the deposited layer of nickel is achieved and the nickel layer reaches the desired thickness of up to slightly more than half the diameter of the diamond particles. Under customary process conditions, the immersion time amounts to approximately 15 to 60 minutes.

The carrier comprising the shims which are now electroless nickel plated, is then removed from the chemical nickel bath and is cleaned in an ultrasonic bath, in order to remove diamond particles which are only loosely attached to the nickel layer. The cleaned shims are taken off the carrier and are subject to a heat treatment for 2 hours at a temperature of at least 150° C. This treatment increases the adhesion of the chemical nickel layer to the steel foil and the bonding of the diamonds in the layer itself.

The area percentage of the joining surface covered with diamonds is 25% on both sides. The thickness of the nickel layer, i.e. of the metallic binder layer, is about 30 µm. The height of the diamonds protruding from the nickel layer is about 20 µm.

The ring-shaped steel foils which are electroless plated with a nickel layer on both sides with embedded diamonds are then spray coated on one side with a spray gun with a rubber coat (liquid rubber spray, black matte, chemical composition based on synthetic rubber, commercially available from Mibenco GmbH, Karlstein am Main, Germany) and then dried after 10 minutes at room temperature in a furnace at 70° C. for 15 minutes. This coating process was repeated for the other side of the steel foil, thus obtaining a connecting element as disclosed herein which is coated on both sides with a rubber coat. Scanning electron micrographs show that the nickel layer and all diamonds are covered with rubber. Cross-sectional cuts show that the diamonds are covered fully by the rubber layer and that the thickness of the rubber coat is about 15 µm in the region between the diamonds, and it is about 5 µm on top of the diamonds.

Comparative Example 1

For testing of the sealing properties of the connecting element, a leakage test was performed. A connecting element as produced in Example 1, but without the rubber coating on both sides, is placed between two parts made of gray cast iron. The parts of gray cast iron had a roughness ($R_z$) value of 25 µm. The connecting element is bolted together with the two parts of gray cast iron with a contact pressure of 100 MPa. One of the two parts of gray cast iron is a solid part with an internal thread for the bolt. The opposing gray cast iron part has a through bore for the bolt to go through and tighten the two parts together. The part with the bolt has a sealing cap which also has a bore for a hose by which compressed air can be applied between the inner parts of the two opposing gray cast iron parts. The leakage testing is performed by immersing the whole apparatus in water and applying an air pressure of 6 bar to the inner parts of the apparatus by the hose. On the water surface, a large number of air bubbles appear, showing that the connection between the connecting element and the two gray cast iron parts is not gastight. This can be explained by a small air gap between the connecting element and the gray cast iron parts into which the diamonds are pressed.

Example 2

The leakage test as described in Comparative Example 1 was carried out with the connecting element as produced in Example 1, with the rubber coating on both sides.

As no air bubbles are appearing on the water surface, this shows that there is no leakage and that the connection between the connecting element and the two gray cast iron parts is gastight. This can be explained by the rubber coating which is sealing the small air gap between the connecting element and the gray cast iron parts into which the diamonds of the connecting element are pressed.

After the leakage test, the connecting element is investigated by SEM (scanning electron microscopy) revealing that the rubber coating has been pushed away from the top of the diamonds. Also the two gray cast iron parts are investigated by SEM showing the craters that the diamonds have created by pressing into the surface. This shows that the diamonds have been pressed into the parts of gray cast iron and that the coefficient of friction has been increased.

Example 3

Another test showing the increase of the coefficient of friction was performed with a gearwheel made of steel which is frontally bolted together with a steel shaft. In a first test there is just the metal to metal contact between the gear wheel and the steel shaft having a surface roughness ($R_z$) of 25 µm each, and no connecting element is used. The tightening force is applied by a central screw. The screw is tightened with a torque of 100 Nm. Now a force for detaching the two parts is applied on the gearwheel. The holding torque is 25 Nm. If a higher force is applied the two parts will turn loose. In a second test, a connecting element as described in example 1 with a polymer coating on both sides is applied between the gearwheel and the steel shaft and tightened with the same force of 100 Nm. In this second test, a holding torque of 75 Nm can be achieved. This shows that an increase of the holding torque and thus an increase of the coefficient of friction can be achieved.

The invention claimed is:
1. A connecting element for frictionally joining two components, comprising
    (i) a metal substrate having two opposite joining surfaces, each joining surface configured to be frictionally joined with a respective component;

(ii) a metallic binder layer disposed on each of the joining surfaces;
(iii) friction-increasing hard particles selected from the group consisting of carbides, borides, nitrides, silicon dioxide, aluminum oxide, diamond and mixtures thereof, wherein the hard particles are fixed on each of the joining surfaces of the metal substrate by the metallic binder layer and wherein the hard particles are embedded within and protrude from the metallic binder layer; and
(iv) an elastically and/or plastically deformable coating material, wherein the metallic binder layer and the hard particles of at least one of the two opposite joining surfaces is coated with at least one layer of the coating material, wherein
the coating material is a polymeric material which can hold back hard particles torn out of the metallic binder layer and enhances sealing between the connecting element and the component to be joined, and wherein, when the connecting element is in frictional engagement with the component to be joined, the hard particles extend through the coating material and into a surface of the component, and the coating material seals with the surface of the component.

2. The connecting element of claim 1, wherein the coating material is an adhesive material.

3. The connecting element of claim 1, wherein the coating material is selected from the group consisting of polyester materials, acrylic materials, epoxy materials, formaldehyde resins, polyurethane materials, polyvinylacetate (PVAC) materials, polyvinyl butyral (PVB) materials, polyvinyl chloride (PVC) materials, silicone materials, rubber materials and combinations thereof.

4. The connecting element of claim 1, wherein the metallic binder layer is a nickel layer.

5. The connecting element of claim 1, wherein the hard particles are diamond.

6. The connecting element of claim 1, wherein the mean particle size of the hard particles is at most 100 µm; the thickness of the metallic binder layer is from 5 to 70 µm; and the thickness of the at least one layer of the coating material is from 1 to 70 µm.

7. The connecting element of claim 1, wherein the thickness of the at least one layer of the coating material is less than the height of the hard particles protruding from the metallic binder layer.

8. A device comprising the connecting element according to claim 1 and two components frictionally joined with the connecting element, wherein a first component of the two components is frictionally joined with the joining surface of the connecting element that is coated with the at least one layer of the coating material.

9. The device of claim 8, wherein the thickness of the at least one layer of the coating material of the connecting element corresponds to the height of the hard particles protruding from the metallic binder layer from which the penetration depth of the hard particles into the first component is subtracted, and wherein the deviation from this thickness is up to +/−5%.

10. The device of claim 8, wherein the two components are frictionally joined with the connecting element with a contact pressure, and wherein the first component has a hardness, and wherein the thickness of the at least one layer of the coating material of the connecting element is selected according to formula (I):

$$TC = D*(1 - 0.62*SQR(P/(HV*AP))) - TB \quad (I)$$

wherein:
TC [µm] is the thickness of the at least one layer of the coating material,
D [µm] is the mean particle size of the hard particles,
"SQR" means square root,
P [MPa] is the contact pressure of the two components frictionally joined with the connecting element,
HV [kg/mm$^2$] is the Vickers hardness of the first component,
AP [%] is the area percentage of joining surface of the connecting element covered with hard particles, and
TB [µm] is the thickness of the metallic binder layer,
and wherein the deviation of the thickness of the at least one layer of the coating material from the value TC calculated by formula (I) is up to +/−5%.

* * * * *